Sept. 26, 1933.  R. J. POMEROY ET AL  1,928,434
AUTOMATIC CLUTCH TRIP FOR FILM DRIVES
Filed Jan. 9, 1929  5 Sheets-Sheet 1

Inventors
Roy J. Pomeroy,
Carl V. Olson.

Attorney.

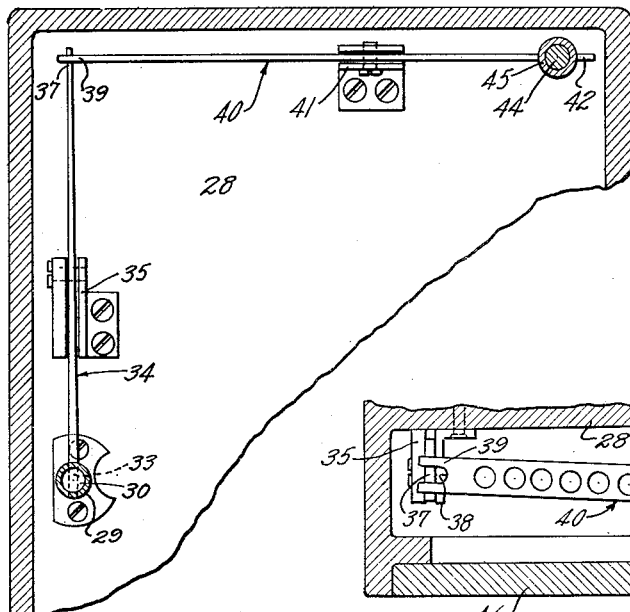
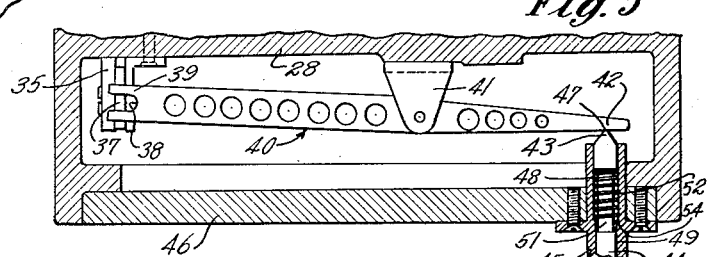
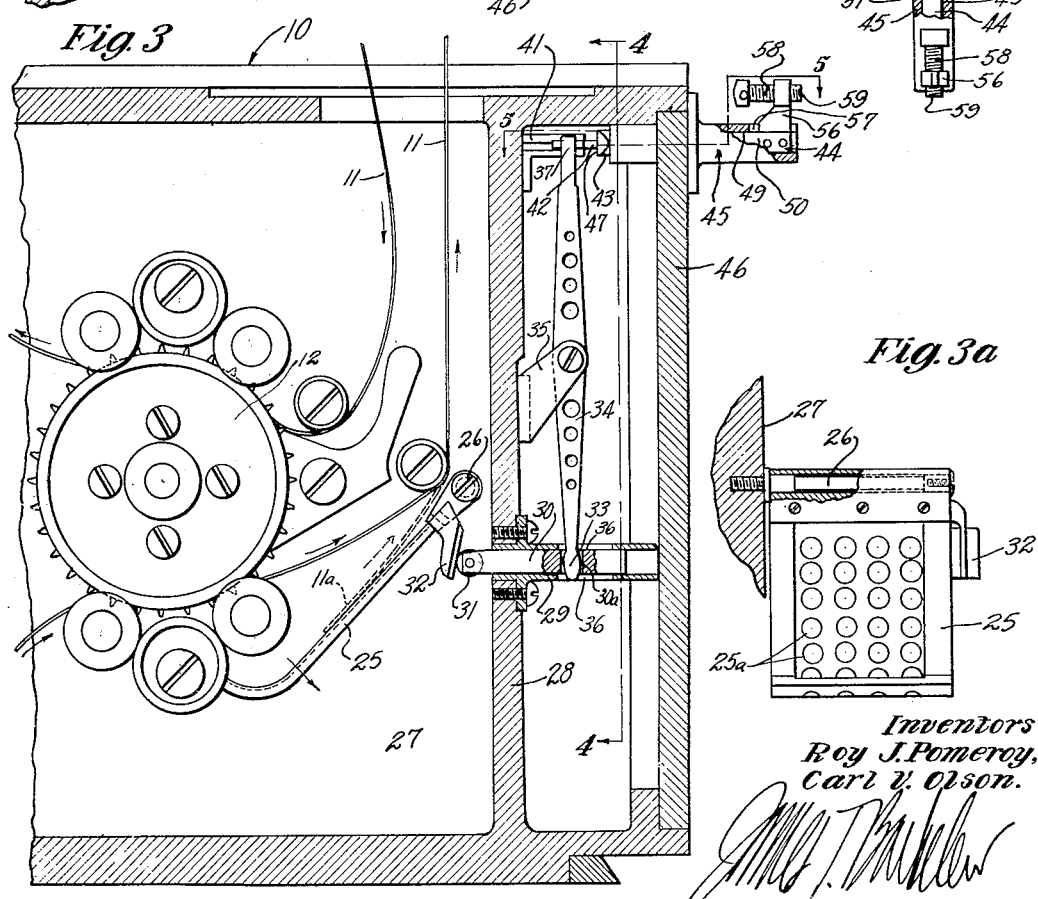
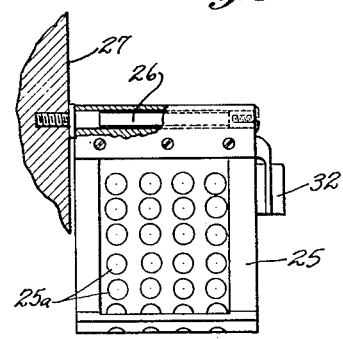

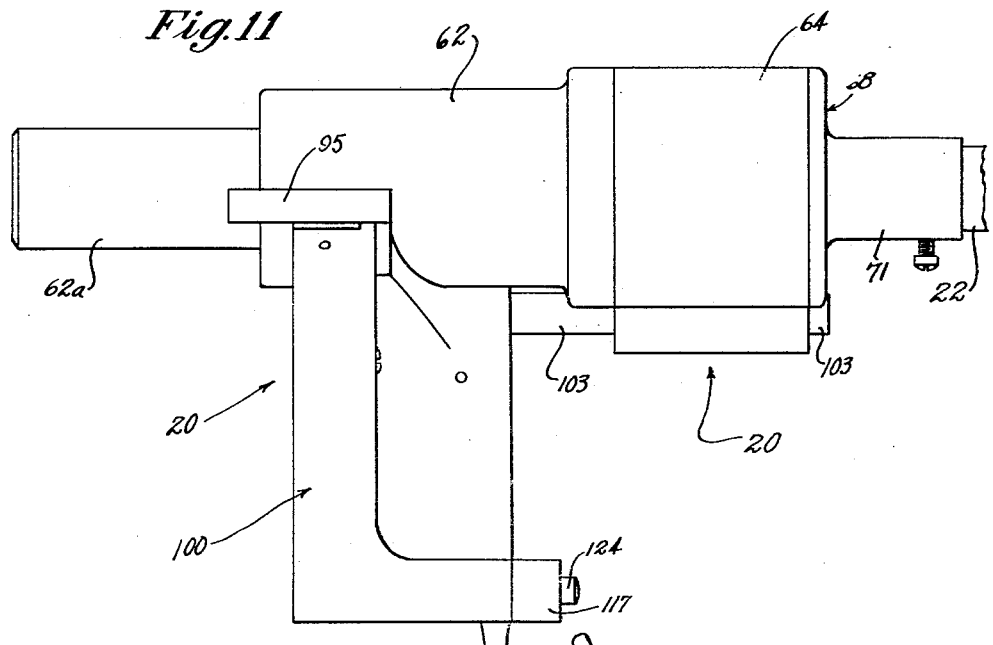
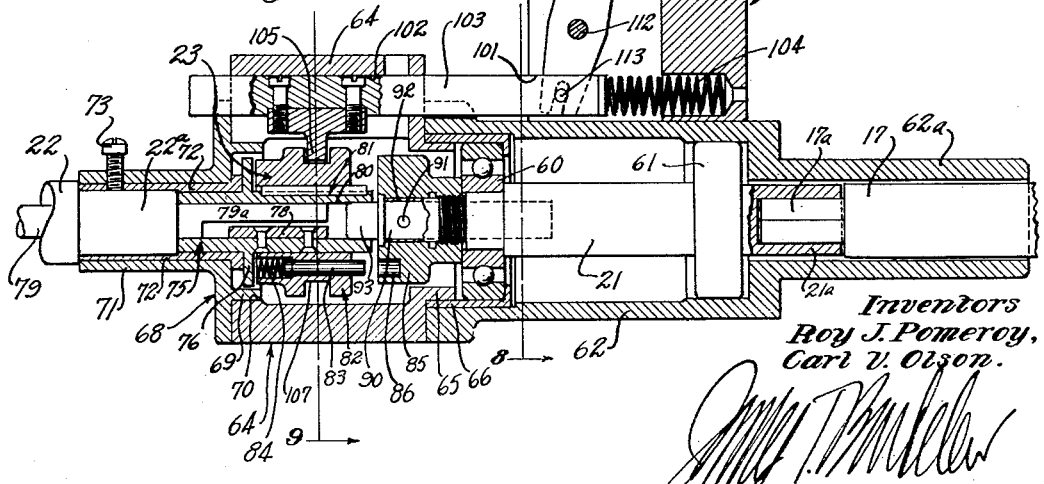

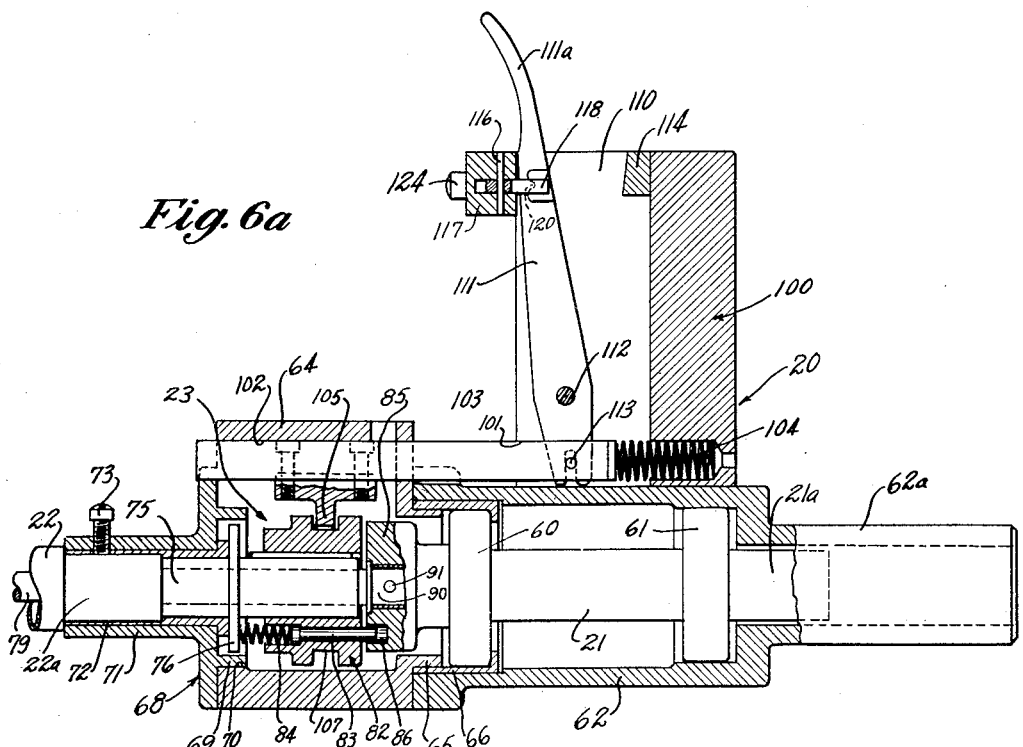
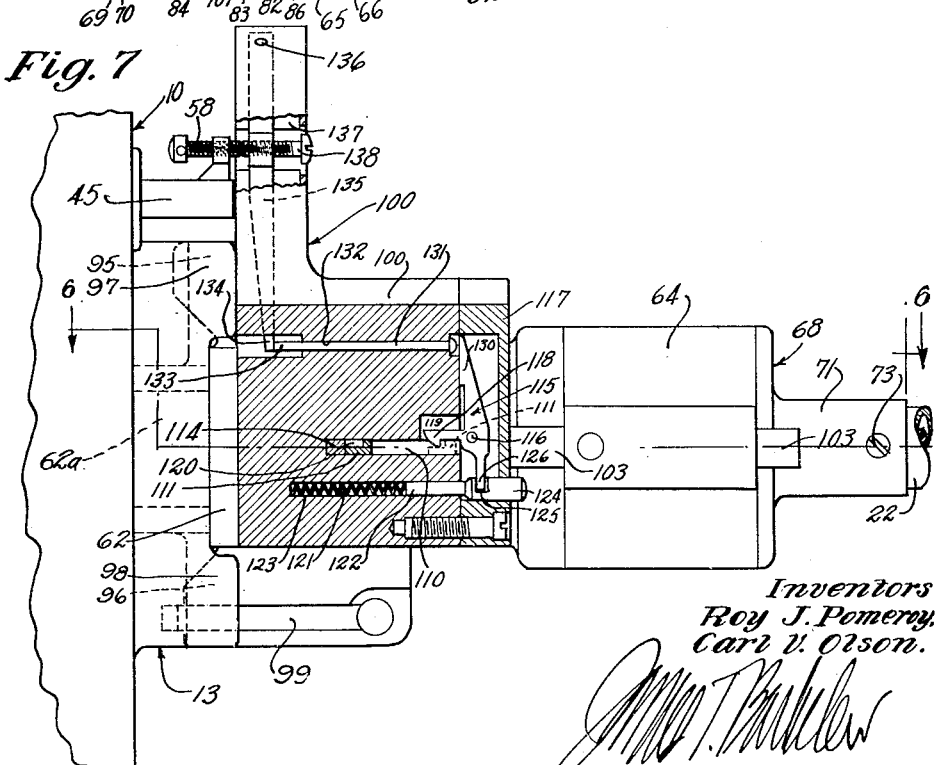

Sept. 26, 1933.   R. J. POMEROY ET AL   1,928,434
AUTOMATIC CLUTCH TRIP FOR FILM DRIVES
Filed Jan. 9, 1929   5 Sheets-Sheet 5
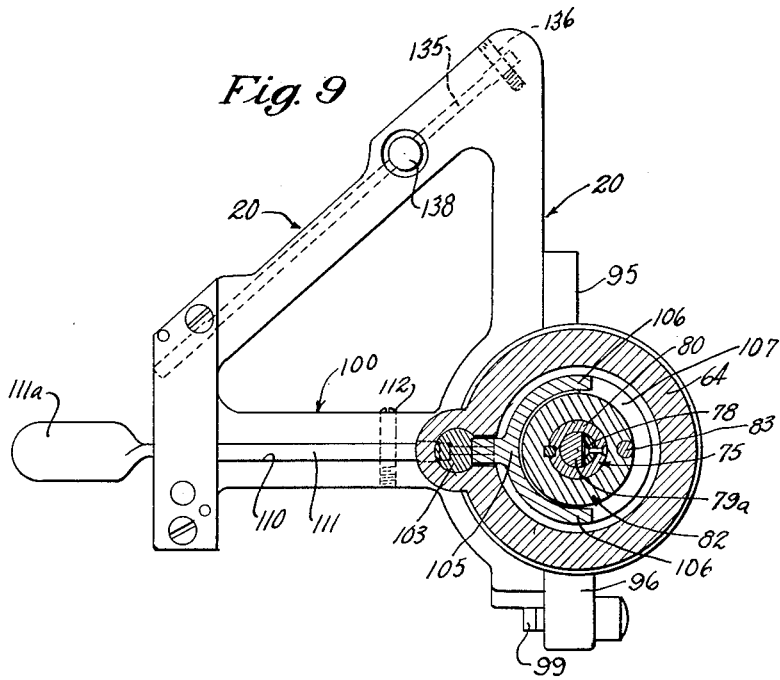
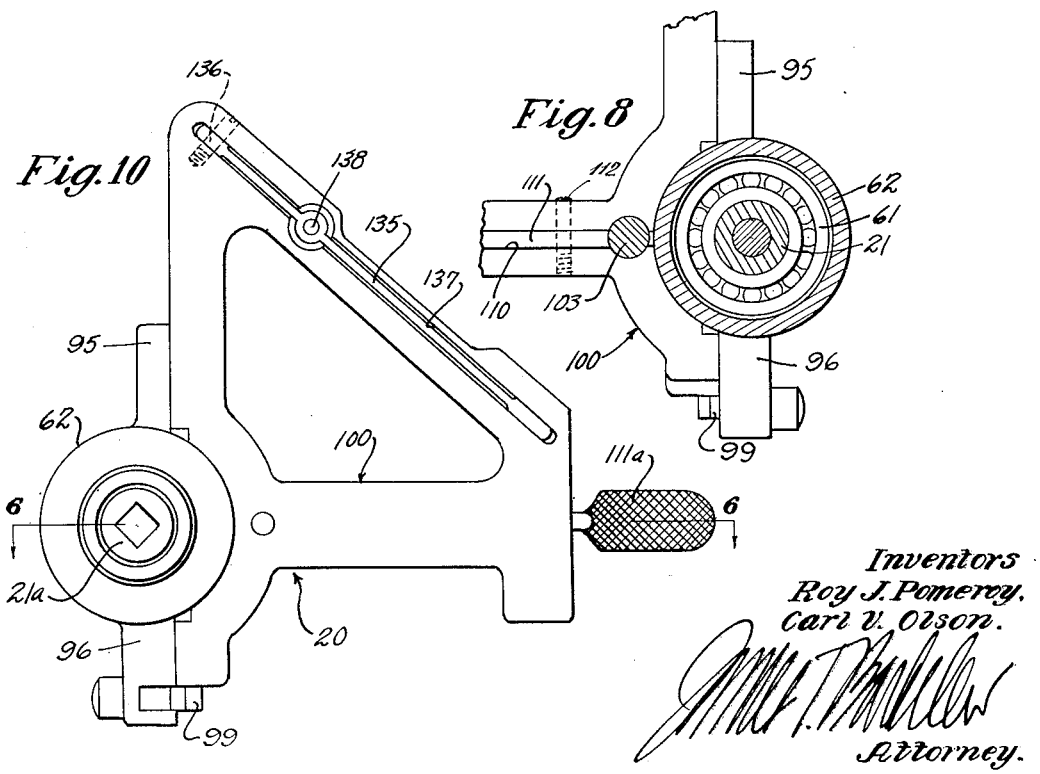
Inventors
Roy J. Pomeroy,
Carl V. Olson.
Attorney.

Patented Sept. 26, 1933

1,928,434

UNITED STATES PATENT OFFICE 1,928,434

AUTOMATIC CLUTCH TRIP FOR FILM DRIVES

Roy J. Pomeroy and Carl V. Olson, Los Angeles, Calif.; said Olson assignor to Paramount Publix Corporation, Los Angeles, Calif., a corporation of New York Application January 9, 1929. Serial No. 331,332

18 Claims. (Cl. 88—17)

This invention has to do with automatically actuated disengaging means for the film drive of motion picture cameras, projecting machines and the like. Although the invention is generally applicable to a variety of such machines, it has particular utility as applied to a motion picture camera and will therefore be herein described and illustrated in a specific adaptation thereto. It will be understood, however, that this specific adaptation is merely illustrative of the invention by way of showing in detail one of its typical practical applications, and therefore constitutes no limitation on the invention.

In the operation of motion picture cameras, projectors and other similar machines handling film, it frequently occurs that the film becomes deranged from its normal passage through the machine, and tangles and balls up to a serious extent before the film moving mechanism can be stopped. This may result from a variety of causes, such as a failure of the take-up reel to wind up the film as fast as it is unwound from the feed-reel and delivered from the film moving mechanism, or due to tearing or breaking of the film, etc. In all such cases the film buckles, or is forced or moves out of its normal path, and if the film drive is not cut off instantly the film balls up in large quantities, wasting many feet of film and in some cases seriously injuring the machine itself. In the case of a hand cranked camera, the operator has such control as will usually make him aware of the derangement and allow him immediately to cease cranking before serious damage results. But in the case of a motor driven camera, a large quantity of film may ball up and do serious damage before the condition is recognized by the operator, and the drive motor can be reached and stopped. In either case, however, a large amount of film is wasted, and great inconvenience and loss of time results from untangling the film and putting the camera back in shape to continue operation.

An object of the invention may now be stated to be the provision of means for interrupting the film drive instantly that the film becomes deranged in its normal and continuous movement through the machine.

To attain this object in the preferred embodiment, we have provided a clutch in the film drive, and clutch disengaging means actuated by contact of the film itself when the film becomes deranged and buckled out of its normal path. Such an arrangement facilitates practically instantaneous stopping of the film moving parts driven through the clutch, as these parts ordinarily have little or no effective momentum and come to an immediate stop when the heavier drive motor and shaft, which could not ordinarily be brought to a relatively quick stop, are disconnected.

The invention will be best understood from the following detailed description of a present embodiment adapted to a motor driven motion picture camera. For this purpose reference is had to the accompanying drawings, in which:

Fig. 3 is a fragmentary vertical section taken from Fig. 1, and showing the trip mechanism within the camera;

Fig. 3a is a fragmentary view taken from Fig. 3, and showing the trip wing and its mounting on the camera wall;

Fig. 4 is a fragmentary vertical section taken on line 4—4 of Fig. 3;

Fig. 5 is a fragmentary horizontal section taken on line 5—5 of Fig. 3;

Fig. 6 is a horizontal longitudinal section of the detachable drive unit, this view being a section taken on broken line 6—6 of Fig. 7;

Fig. 6a is a view similar to Fig. 6, but with the clutch in engaged position;

Fig. 7 is a vertical section taken on line 7—7 of Fig. 6, and showing the rear portion of the camera;

Fig. 8 is a vertical section taken on line 8—8 of Fig. 6;

Fig. 9 is a vertical section taken on line 9—9 of Fig. 6;

Fig. 10 is a right hand end elevation of the drive unit of Fig. 6, this end being adjacent the camera when the drive unit is attached thereto, as in Figs. 1 and 2; and Fig. 11 is a top elevation of the drive unit of Fig. 6.

Figure 1:
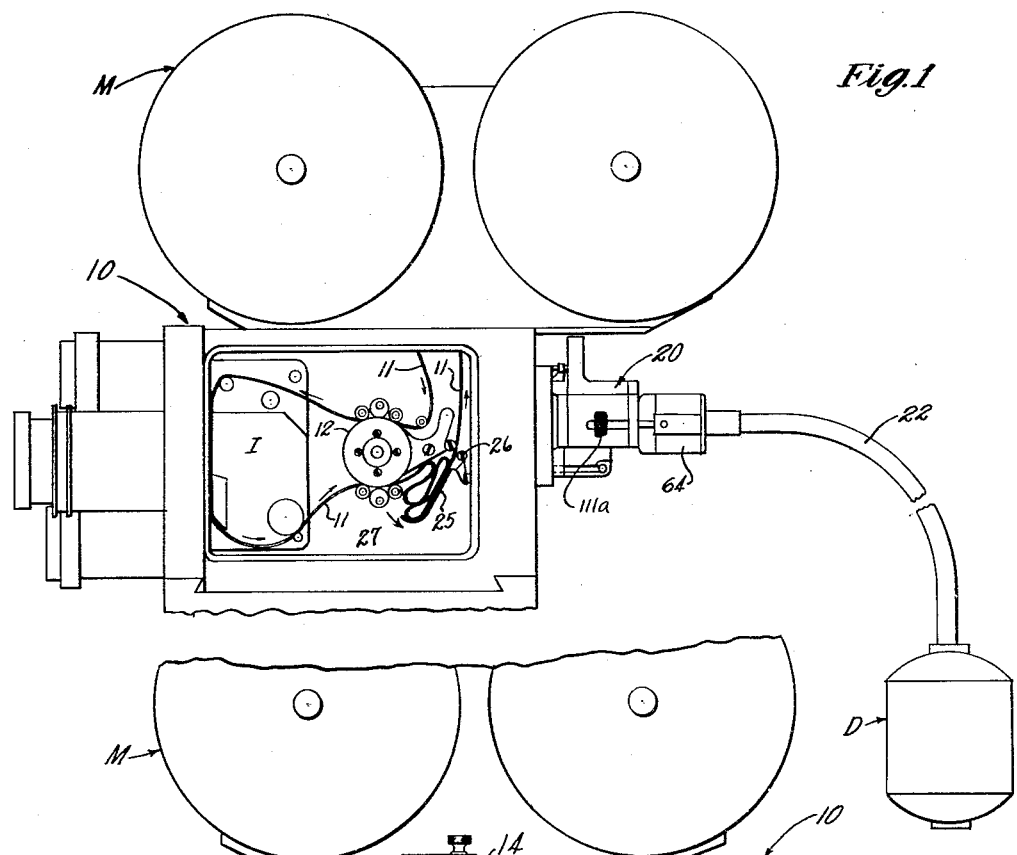
Fig. 1 illustrates our invention as applied to a typical motion picture camera, the film in this instance being shown buckled out of its normal path in such manner as will actuate the clutch trip.

Referring to the drawings and particularly to Fig. 1, the numeral 10 indicates diagrammatically a typical motion picture camera having a magazine M in which are located the usual feed and take-up reels, not shown. From the feed reel the film 11 passes over the usual film guides, over the top side of the sprocket wheel 12, through the film moving mechanism I, over the bottom side of sprocket wheel 12, and is then guided back up into the magazine to the take-up reel. In Fig. 1 the film is shown buckled out of its normal path after leaving the sprocket wheel 12, as hereinabove referred to, the normal path of the film being shown in Fig. 3.

Figure 2:
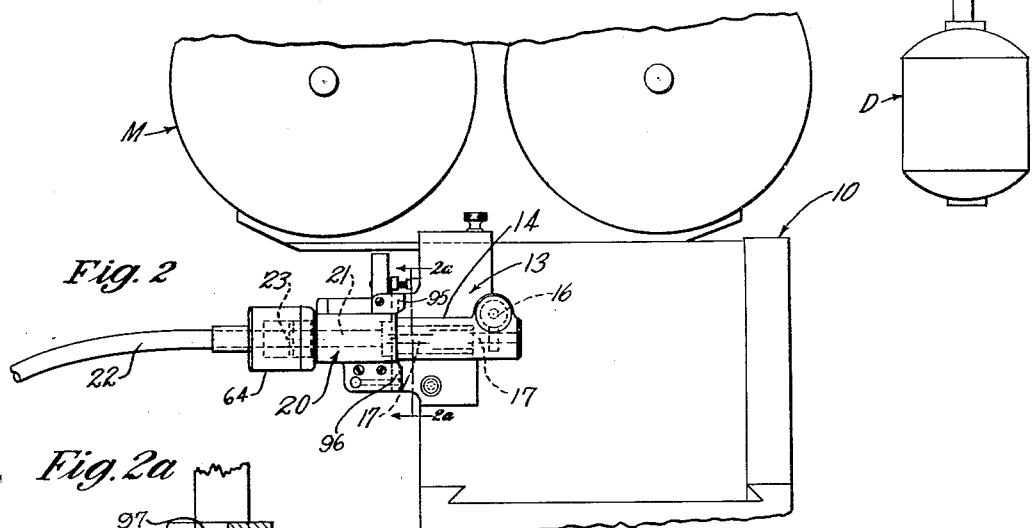
Fig. 2 shows the opposite side of the camera as shown in Fig. 1, and indicates the connection of the drive mechanism to the camera and the attachment of the present invention.

Referring now to Fig. 2, the numeral 13 indicates what is generally known as the right angle drive, this comprising a gear housing 14 adapted to be clamped to the body of the camera, and carrying a camera drive shaft 16 having operative connection with the camera mechanism, and a drive shaft 17 geared thereto at right angles and adapted at its rear end for detachable connection with the driving means. The numeral 20 indicates a detachable drive unit having a drive shaft 21 adapted for detachable operative connection with shaft 17, shaft 21 being driven in turn by a flexible drive housed within a flexible tubing 22, and connected with a source of power as an electric motor D. Provided in shaft 21 is a clutch 23, which is caused to be automatically disengaged when the film buckles out of its normal path, as will hereinafter be described. The means of detachably connecting unit 20 with the right angle drive 13 will be described later.

In Fig. 1 the film is shown as buckling just after leaving the sprocket wheel 12 on its way to the take-up reel within magazine M. This is the point at which buckling and balling up may occur, for the film is moved positively up to this point, but may here slacken and ball up if the take-up reel does not take it up as fast as it is delivered from the positively driven film moving mechanism and sprocket. Referring now to Figs. 1, 3 and 3a, there is provided just below the normal path of the film at this point a trip wing or finger 25, which is pivotally mounted at its upper end upon a stud 26 screwed into the camera wall 27. This trip wing, which is normally yieldingly held in the position of Fig. 3, as hereinafter described, is adapted to be contacted by the buckling film and thereby swung downward a short distance, as in Fig. 1. This trip wing is preferably of some light material, such as duralumin, and is drilled with a number of holes 25a to further reduce its weight as far as possible so that it offers very little resistance to movement. It has been made apparent that buckling of the film due to failure of the take-up reel to wind up the film as fast as it is moved by the film moving mechanism causes the trip wing to be contacted and moved downward; and it is now further to be noted that breaking of the film, either at a point ahead of, or beyond the location of the trip wing, will effect the same result. If the break occurs ahead of the trip wing, for instance, then as the broken film is pulled onto the take-up reel the broken end flips down due to resilient straightening out, as indicated at 11a in the dotted lines of Fig. 3, and contacts the trip wing with sufficient force to cause its actuation. Or, if the break occurs beyond the trip wing, the film will continue to be delivered from the bottom side of the sprocket wheel 12, and will there buckle outward to actuate the trip wing, as shown in Fig. 1. The same thing occurs if the take up reel fails to take up the film properly, as has been shown. Thus in any case of film breakage or derangement, the trip is moved down as in Fig. 1.

The means for transmitting this motion of the trip wing to clutch 23 for its disengagement will now be described. In Figs. 3, 4 and 5 are shown means for transmitting the motion exterior of the camera, as adapted to a typical and well known commercial camera. It is to be understood, of course, that this means may be varied to suit the particular characteristics of any camera, projector, etc., to which it may be desired to attach the present invention.

The camera, or camera housing, 10 to which the invention has been applied in the present embodiment has a vertical transverse partition 28, and mounted in this partition 28 is a guide tube 29 slidably carrying a plunger 30. Plunger 30 has a roller 31 at its inner end which is contacted by a shoe 32 provided on the trip wing near its pivoted end. When the trip wing is moved downward, shoe 32 works on roller 31 to move the plunger rearward, the roller being provided to reduce frictional resistance between the wing shoe and the plunger. Plunger 30 has a slot 30a which takes the lower free end 33 of a vertical lever 34, lever 34 being pivotally mounted near its center upon a bracket 35 screwed to partition 28, and an elongated slot 36 being provided in the guide tube to pass the end of the lever and provide for movement thereof, and, if desired, to limit the movement thereof to determine the range of movement of wing 25. Referring now to Figs. 4 and 5, the upper free end 37 of lever 34 is taken in a slot 38 provided in the end 39 of a horizontal lever 40, which is pivotally mounted upon a bracket 41 screwed to partition 28. The other swinging end 42 of lever 40 engages the tip 43 of a plunger 44 slidably carried within plunger guide 45, mounted in the back door 46 of the camera. Tip 43 preferably has a hardened polished edge 47 to reduce the frictional resistance of its contact with the end of lever 40. The inner portion of plunger guide 45 has a bore 48 within which the plunger tip 43 has a sliding fit, and the exterior portion of the plunger guide has a reduced bore 49 within which the rear end part 50 of plunger 44 has a sliding fit, the plunger tip 43 and plunger part 50 being connected by a medial portion 51 of reduced diameter. An expansion spring 52 is disposed about the plunger part 51, and is confined between the plunger tip and the shoulder 54 provided between the two bores of the plunger guide, thus acting constantly to press the plunger against the end of beam 40, and thereby yieldingly holding the trip wing in its upper or normal position, as in Fig. 3. The outer end of plunger 50 has a bracket 56 which extends through an elongated slot 57 in the guide tube, and carries an adjustable contact screw 58, the outer end 59 of which transmits the motion of trip wing 25 to the trip mechanism of the detachable drive unit 20, which will now be set out in detail.

Reference is now had generally to Figs. 6 to 11 inclusive, and first to Fig. 6. Drive shaft 21, previously referred to in connection with Fig. 2, is carried within suitable bearings 60 and 61 mounted in barrel 62. Barrel 62 has a reduced end portion 62a adapted for insertion within gear housing 14 of the right angle drive, and the end of shaft 21 has a squared socket 21a for detachable driving connection with the squared end 17a of the right angle drive shaft 17. A clutch housing 64 is provided at the left hand end of barrel 62, as viewed in Fig. 6, and has an annular flange 65 which passes within the bore of barrel 62, a bushing 66 preferably being provided within the end of barrel 62 and making a snug fit with clutch housing flange 65.

Provided over the other end of clutch housing 64 is an end flange 68 which has an annular flange 69 fitting snugly within the bore 70 of the clutch housing. End flange 68 is provided with an outwardly extending tube 71 having a bushing 72 within which the end connection 22a of the flexible drive tube 22 is inserted, a set screw 73 being provided through the tube and bushing to hold the flexible drive shaft tube in position.

Turning within bushing 72 is a tubular clutch spindle 75, a flange 76 being provided about the spindle adjacent the inner end of bushing 72 to retain the spindle within the clutch housing. A fillet element 78, of the cross sectional form shown in Fig. 9, is riveted within the bore of bushing 75, and thus provides a socket which drivingly receives the corresponding driving end 79a of the flexible drive shaft 79. Slidably mounted on the inner end 80 of clutch spindle 75 and splined thereto at 81 is a clutch shuttle 82. Shuttle 82 is provided with a drive pin 83 which is pressed outward by means of expansion spring 84 confined between the head of the pin and the flange 76 of the clutch spindle. Screwed on the hollow end 92 of shaft 21 is a clutch head 85 having a drill hole 86 extending inward from its outer face for engagement of the clutch drive pin 83. A clutch spindle pilot 90 is pinned at 91 within the hollow end 92 of shaft 21, and has a pilot portion 93 extending beyond the face of the clutch head and having a running fit within the end of the clutch spindle 75.

Movement of clutch shuttle 82 from the disengaged position of Fig. 6 to the right, as to the position of Fig. 6a, causes the drive pin 83 to engage the drill hole of clutch head 85, and thus rotatably connects the flexible drive shaft 79 with shaft 21. As the shuttle moves toward the clutch head, the expansion spring 84 allows the drive pin 83 to ride on the face of the clutch head until it finds the hole 86, when it springs in and makes the connection. Movement of the clutch shuttle to the left causes disengagement of the flexible drive shaft 79 and shaft 21, as will be understood.

Figure 2A:
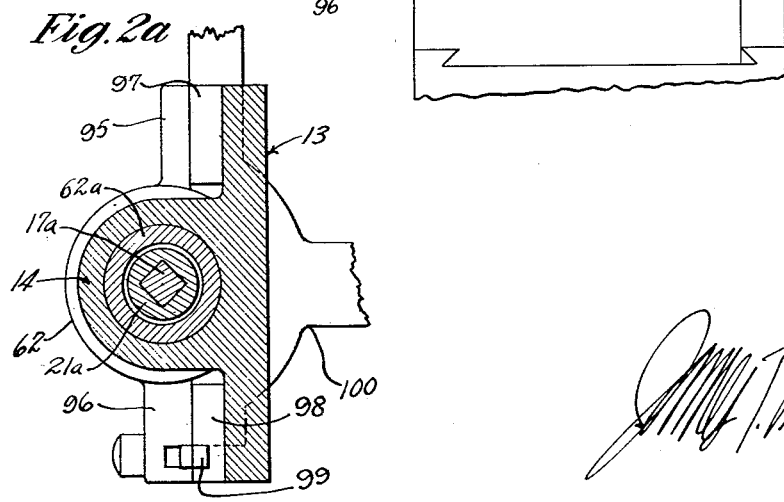
Fig. 2a is a vertical section taken on line 2a—2a of Fig. 2.

Barrel 62 has upper and lower brackets 95 and 96 respectively, which abut against shoulders 97 and 98 of the right angle drive unit 13 when the barrel end 62a is inserted within its gear housing 14, as shown in Fig. 2a. The lower bracket 96 has a spring pressed latch 99 adapted to catch over shoulder 98 when the barrel end 62a is shoved home within housing 14. The drive unit 20 is thus attached to the right angle drive of the camera by simply inserting barrel end 62a within housing 14 and shoving it home, brackets 95 and 96 positioning and supporting the device by riding on shoulders 97 and 98, and latch 99 snapping over shoulder 98 to lock the device in position. Shafts 17 and 21 are then drivingly engaged, as explained.

Mounted upon barrel 62 and brackets 95 and 96 is a frame casting 100, which supports means for manually engaging and disengaging clutch 23, and also clutch disengaging means actuated by contact of the trip wing controlled contact screw 58. Coaxial and equal diameter bores 101 and 102 are provided in frame 100 and clutch housing 64, respectively, and mounted to slide in these bores is a clutch shifter rod 103. A relatively stiff clutch shifter spring 104 is positioned in bore 101 behind rod 103, and presses the clutch shifter rod 103 towards the left, as viewed in Fig. 6. Shifter rod 103 carries a yoke 105, the fingers 106 of which are disposed within an annular groove 107 provided about clutch shuttle 82, and thus move the shuttle axially to engage or disengage the clutch when the shifter rod 103 is moved in one direction or the other. It will be noted that spring 104 tends normally to hold rod 103 in its left hand position, as shown in Fig. 6, in which position the clutch is disengaged. In Fig. 6a, rod 103 has been moved to the right against the force of spring 104, and clutch 23 is engaged. The disengaged position is thus the normal position of the clutch, and will be instantly assumed if rod 103 is released and spring 104 allowed to move it.

Frame 100 has a slot 110, within which a set lever 111 is pivotally mounted upon screw 112. The inner end of the set lever has operative connection with rod 103 as at 113, and the outer end 111a extends outside of the frame and provides a finger piece by which the lever may be moved. It will be seen that movement of the outer end 111a to the left, as to the position of 6a, moves shifter rod 103 to the right against the force of spring 104, thereby engaging the clutch. A fiber bumper block 114 carried in slot 110 provides a resilient stop for the set lever when it is released from its "set" position of Fig. 6a, as hereinafter explained, and snaps back under the force of spring 104 to the position of Fig. 6.

The set lever is held in the "set" position of Fig. 6a by means of a trigger 115, (see Fig. 7) which is pivotally mounted upon a pin 116 carried in a trigger housing 117 screwed to frame 100. Trigger 116 has a catch 118 which extends into a recess 119 and slot 110 of frame 100, and is adapted to engage the set lever 111 to releasably hold it in the "set" or clutch engaged position of Fig. 6a, as indicated in the dotted lines of Fig. 7. The set lever is recessed in such shape as to provide a relatively small catch contact 120 which may be easily tripped.

The catch is normally pressed into engagement with the set lever by means of a spring 121 confined back of plunger 122 in a frame bore 123, plunger 122 working against a trigger button 124 mounted in the trigger housing and having a recess 125 in which is taken the end of trigger finger 126. The trigger button extends through the trigger housing, and may be manually pressed to release the catch from the set lever, as will be apparent.

The trigger has a trip finger 130 which is acted upon at its end by the head of a trip pin 131 working in a frame bore 132. The other end 136 of the trip pin is acted upon by the end 134 of a trip lever 135 (Figs. 7 and 9), which is pivoted at its other end at 136 within a slot 137 provided in the frame. The trip lever has an adjustable contact screw 138 which is engaged by the previously described contact screw 58 mounted on the camera, as shown in Fig. 7. Movement of the contact screw 138 on lever 135 moves pin 131, which in turn trips trigger 115. The set lever then being released, spring 104 causes it to snap back to the position of Fig. 6, and the shifter rod to disengage the clutch.

The method of operation of the entire system will be apparent from the above description, but a brief recapitulation will here be given.

The set lever normally takes the clutch-disengaged position of Fig. 6 under the pressure of spring 104. To engage the clutch, the set lever is manually "set" or moved to the position of Fig. 6a, at which position it is engaged and releasably held by catch 118 acting under the pressure of spring 121. The flexible drive shaft is then directly connected to the film moving mechanism of the camera. The clutch may now be disengaged manually by pressing on the trigger button 124, which releases the catch and allows the set lever to snap back to the position of Fig. 6, and the clutch to be disengaged. Or, with the device "set" as in Fig. 6a and the camera in operation, if the film becomes deranged in any manner the resultant buckling or deviation of the film from its normal path will cause the trip wing to be contacted and actuated. The result of this is that contact screw 58 is moved outward and actuates the contact screw of the detachable drive unit 20, thereby causing movement of the trigger and release of the set lever, which immediately snaps back and allows clutch 23 to be disengaged under the force of spring 104.

The result of a deviation of the film from its normal path, therefore, in the preferred embodiment, is an instant disengagement of a clutch provided in the shaft which drives the film moving mechanism, thus instantly stopping the mechanism before more than a few inches of film have been wasted. The camera mechanism as a whole has so little momentum that stopping takes place almost instantaneously when the drive parts are thus disconnected. The preferred arrangement is therefore that in which the camera mechanism is stopped by disconnecting the drive motor, which may continue to run until shut off.

The trip mechanism parts are made very light, and the working bearings are made as frictionless as possible, so that the lightest contact of the film will actuate the trip wing and cause the clutch to be disengaged. Thus when the film breaks, for instance, the mere contact of the free end of the broken film will be sufficient to actuate the trip mechanism and stop the camera.

The invention has now been disclosed by way of a specific adaptation to a particular camera; but it is to be understood that this particularization of the invention is for illustrative purposes only, and that the invention may readily be adapted to various other cameras, as well as to other film carrying machines such as projectors, printers, etc., the adaptations to all of which are to be included within the scope of the claims appended hereto.

We claim:

1. In combination with means for guiding a film through a normal path and film driving means, a clutch spring-actuated to disengaged position provided in said film driving means, a trigger having a catch for holding said clutch in engaged position, and a movable trip member normally in a position out of engagement with the film in its normal path and operatively connected to said trigger for release of the clutch by virtue of movement due to contact of the trip member by the film when the film deviates from its normal path.

2. In combination with means for guiding a film through a normal path and film driving means, a clutch provided in said film driving means, a clutch-disengaging spring constantly acting on said clutch, releasable catch means to hold said clutch in engaged position against the pressure of said clutch-disengaging spring, a movable trip member normally yieldingly held in a position adjacent but out of engagement with the film in its normal path, said trip member movable by contact of the film when the film deviates from its normal path, and motion transmitting means between said trip member and said catch means whereby said clutch is moved to disengaged position by said clutch-disengaging spring.

3. In combination with means for guiding a film through a normal path and film moving mechanism, a clutch in the film moving mechanism, spring actuated clutch-disengaging means constantly acting on said clutch, a manually actuated lever for moving said clutch to engaged position against the force of said spring actuated clutch-disengaging means, a trigger having a catch for releasably locking said lever in clutch engaged position, spring means constantly urging said trigger to locking position, a movable trip member normally yieldingly positioned adjacent but out of engagement with the film in its normal path, said trip member movable by contact of the film when the film deviates from its normal path, and motion transmitting means between said trip member and said trigger whereby said trigger is moved to release the clutch operating lever by virtue of movement of the trip member.

4. In combination with a machine having means for guiding a film through a normal path and film moving mechanism, a trip member pivotally mounted on the machine in a position normally adjacent but out of contact with the film in its normal path, a movable contact member mounted on the machine and operatively connected to the trip member to be moved thereby, a spring to hold the trip member yieldingly in its normal position, a drive unit detachably connected to the machine, a drive shaft in the drive unit detachably connected at one end to the film moving mechanism, a drive motor connected to the other end of the drive shaft, a clutch in the drive shaft of the drive unit, spring actuated clutch-disengaging means acting on said clutch, a trigger having a catch for holding said clutch in engaged position, a spring constantly urging the trigger to position to catch the clutch in engaged position, and trip means mounted on the drive unit for releasing said trigger against its spring and adapted to be operatively engaged by the movable contact of the said machine when the drive unit is attached to the machine.

5. In combination with a machine embodying film guiding and moving means, trip means on said machine including a movable trip member yieldingly held in a normal position adjacent but out of contact with the film in its normal path and adapted to be moved by virtue of film deviation, a drive unit detachably connected to said machine, a drive shaft in said drive unit detachably drivingly connected to said film moving means, means to drive said drive shaft, a clutch in the drive shaft of said drive unit, spring actuated clutch disengaging means in said drive unit, a releasable catch holding the clutch in closed position against said disengaging means and a movable actuating member on the drive unit for releasing said catch, said actuating member being adapted to be engaged by the trip means on the machine when the drive unit is attached to the said machine, and to be moved thereby when the said trip member moves due to film deviation.

6. In combination with means for guiding a film through a normal path and film driving means, a clutch in said driving means, spring means constantly urging said clutch to open position, a catch operating to hold the clutch in closed position, a trigger releasably holding the catch in its clutch holding position, a spring constantly acting to hold the catch in clutch holding position, a movable trip member normally out of engagement with the film in its normal path and adapted to be actuated by deviation of the film from its normal path, and motion transmitting means between said trip member and said trigger, such that movement of said trip member due to contact of the film causes said trigger to act in opposition to the catch holding spring to release the catch from clutch-holding position.

7. An attachment for a motion picture camera having an operating shaft and a feed and take-up mechanism, said attachment embodying: a housing mounted on said camera adjacent said operating shaft; a clutch in said housing; a driving member in said clutch engaging said operating shaft; a driven member in said clutch adapted to be driven by a main drive shaft; and means including a swinging finger positioned in said camera adjacent said feed and take-up sprocket operated by a buckled section of film coming from said feed and take-up sprocket for disengaging said clutch mechanism.

8. For use in combination with a motion picture camera and a power drive therefor, a clutch mechanism embodying: a clutch housing; means for attaching said clutch housing to the housing of said camera; a rotor in said clutch housing having opposite ends thereof in rigid engagement with a camera operating shaft and a power drive shaft respectively; clutch members mounted on said rotor for transmitting rotation from said power shaft to said camera operating shaft; lever means for moving said clutch members into engagement with each other; yieldable means for moving said clutch members out of engagement with each other; a releasable latch for holding said lever in a clutch engaging position; a trigger for releasing said latch; and automatic means operated by a buckled section of film in said camera for imparting latch releasing movement to said trigger.

9. In a motion picture camera, the combination of: a camera housing; a camera operating shaft; drive means for said shaft; a film sprocket in said housing; a swinging finger having a pivot mounting in said housing, said finger yieldingly held in a normal position hanging downwardly from said pivot alongside but normally out of contact with a stretch of film coming from said sprocket, said finger adapted to be moved by film engagement upon deviation from normal path of the film section coming from said sprocket; motion transmitting means mounted in said housing in association with said finger to be moved by said finger; and means operated by said motion transmitting means for controlling drive of said camera shaft by said drive means.

10. In a motion picture camera, the combination of: a camera housing; a camera operating shaft; drive means for said shaft; a film sprocket in said housing; a swinging finger pivotally mounted in said housing adjacent said film sprocket and adapted to be moved by film engagement upon deviation from normal path of the film section coming from said sprocket; a plunger mounted to reciprocate through a wall of said camera housing; means operatively associating said plunger with said swinging finger; and means operated by said plunger for controlling drive of said camera shaft by said drive means.

11. In a motion picture camera, the combination of: a camera housing; a camera drive shaft; a film sprocket in said housing; a swinging finger having a pivot mounting in said housing, said finger yieldingly held in a position hanging downwardly from said pivot along side but normally out of contact with a stretch of film coming from said sprocket, said finger adapted to be moved by film engagement upon deviation from normal path of the film section coming from said sprocket; a plunger mounted to reciprocate through a wall of said camera housing, said plunger operatively associated with said swinging finger to be moved thereby, and adapted to transmit such movement exteriorly of the camera housing.

12. In combination with a motion picture camera embodying a housing having film guiding and moving means and a camera operating shaft: film actuatable means in said housing including a movable finger yieldably held in a normal position adjacent but out of contact with a section of the film in its normal path through said housing and adapted to be moved by film contact upon deviation of the film from its normal path, said means also including a motion transmitting member adapted to transmit motion of said means exteriorly of said camera housing; a drive unit detachably mounted on said camera housing; a driven shaft in said drive unit operatively connectible with said camera operating shaft when said drive unit is mounted on the camera housing; control means on said drive unit governing stopping and starting of said driven shaft; said control means including a movable element mounted on said drive unit and adapted to be engaged by said motion transmitting member of said film actuatable means when the drive unit is mounted on the camera housing, and to be moved thereby upon film caused movement of said film actuatable means to operate said control means in a manner to cause stopping of the driven shaft of said drive unit.

13. In a motion picture camera, the combination of: a camera housing; a camera operating shaft; a clutch mechanism; a main drive shaft for driving said camera operating shaft through said clutch mechanism; a feed and take-up sprocket rotatably mounted in said housing and adapted to control the movement of a film through said camera; a swinging finger pivotally mounted in said housing adjacent to said feed and take-up sprocket and adapted to be moved by engagement with a buckled film section coming from said sprocket; and means associated with said finger, including a member movably mounted in said housing in sliding engagement with said finger, and a plunger movable with said member, for operating said clutch mechanism when said finger is moved.

14. In a motion picture camera, the combination of: a camera housing; a camera operating shaft; a clutch mechanism; a main drive shaft for driving said camera operating shaft through said clutch mechanism; a feed and take-up sprocket rotatably mounted in said housing and adapted to control the movement of a film through said camera; a swinging finger pivotally mounted in said housing adjacent to said feed and take-up sprocket and adapted to be moved by engagement with a buckled film section coming from said sprocket; and means associated with said finger, including a member movably mounted in said housing in sliding engagement with said finger, a plunger moving with said member, and trigger means adapted to receive movement from said plunger, for operating said clutch mechanism when said finger is moved.

15. In a motion picture camera, the combination of: a camera housing; a camera operating shaft; a clutch mechanism; a main drive shaft for driving said camera operating shaft through said clutch mechanism; a feed and take-up sprocket rotatably mounted in said housing and adapted to control the movement of a film through said camera; a swinging finger pivotally mounted in said housing adjacent to said feed and take-up sprocket and adapted to be moved by engagement with a buckled film section coming from said sprocket; and means associated with said finger, including a member movably mounted in said housing in sliding engagement with said finger, a plunger movable with said member, and a spring for holding said member in yieldable engagement with said finger, for operating said clutch mechanism when said finger is moved.

16. For use in combination with a motion picture camera and a power drive therefor, a clutch mechanism embodying: a clutch housing; means for attaching said clutch housing to the housing of said camera; a rotor in said clutch housing having opposite ends thereof in rigid engagement with a camera operating shaft and a power drive shaft respectively; clutch members mounted on said rotor for transmitting rotation from said power shaft to said camera operating shaft; lever means for moving said clutch members into engagement with each other; yieldable means for moving said clutch members out of engagement with each other; a releasable latch for holding said lever in a clutch engaging position; trigger means for releasing said latch; and automatic means operated by a buckled section of film in said camera for imparting latch releasing movement to said trigger, said last mentioned automatic means comprising a swinging finger pivotally mounted in said camera and adapted to be engaged by a buckled film, a finger controlled member in sliding engagement with said finger, and a plunger movable by said member and having an end portion thereof in engageable relation with said trigger means.

17. An attachment for a motion picture camera having an operating shaft and a feed and take-up sprocket, said attachment embodying: a housing mounted on said camera adjacent said operating shaft; a clutch mechanism in said housing; a driving member in said clutch mechanism engaging said operating shaft; a driven member in said clutch mechanism adapted to be driven by a main drive shaft; a swinging finger mounted in said camera adjacent said feed and take-up sprocket and adapted to be moved by engagement with a buckled film section coming from said sprocket; and means associated with said finger for operating said clutch mechanism when said finger is moved.

18. An attachment for a motion picture camera having an operating shaft and a feed and take-up sprocket, said attachment embodying: a housing mounted on said camera adjacent said operating shaft; a clutch mechanism in said housing; a driving member in said clutch mechanism engaging said operating shaft; a driven member in said clutch mechanism adapted to be driven by a main drive shaft; a swinging finger pivotally mounted in said camera adjacent said feed and take-up sprocket and adapted to be moved by engagement with a buckled film section coming from said sprocket; and means associated with said finger including a member movably mounted in said camera in sliding engagement with said finger for operating said clutch mechanism when said finger is moved.

ROY J. POMEROY.
CARL V. OLSON.